(12) United States Patent
Simpson et al.

(10) Patent No.: US 7,281,840 B2
(45) Date of Patent: Oct. 16, 2007

(54) CHEMICAL MIXING APPARATUS

(75) Inventors: Michael B. Simpson, Elgin, TX (US);
George V. Woodley, Reno, NV (US);
Gary R. Anderson, Austin, TX (US)

(73) Assignee: Tres-Ark, Inc., Austin, TX (US)

( * ) Notice: Subject to any disclaimer, the term of this patent is extended or adjusted under 35 U.S.C. 154(b) by 303 days.

(21) Appl. No.: 10/887,705

(22) Filed: Jul. 9, 2004

(65) Prior Publication Data

US 2006/0009875 A1    Jan. 12, 2006

(51) Int. Cl.
*B01F 15/02* (2006.01)
(52) U.S. Cl. .................... 366/132; 366/136; 366/152.1
(58) Field of Classification Search ................ 366/141, 366/152.1, 152.2, 136, 137, 142, 132; 137/3, 137/4, 92; 700/265, 266, 285
See application file for complete search history.

(56) References Cited

U.S. PATENT DOCUMENTS

| | | | |
|---|---|---|---|
| 3,826,904 A * | 7/1974 | Leonard et al. ............. | 705/413 |
| 3,896,312 A | 7/1975 | Brown et al. | |
| 3,987,808 A * | 10/1976 | Carbonell et al. ............. | 137/3 |
| 3,997,786 A | 12/1976 | Lauer et al. | |
| 4,251,870 A | 2/1981 | Jaffe | |
| 4,363,742 A | 12/1982 | Stone | |
| 4,403,866 A * | 9/1983 | Falcoff et al. ............... | 366/132 |
| 4,766,551 A | 8/1988 | Begley | |
| 4,798,954 A | 1/1989 | Stevenson | |
| 4,975,581 A | 12/1990 | Robinson et al. | |
| 4,994,671 A | 2/1991 | Safinya et al. | |
| 5,117,370 A | 5/1992 | DeCello et al. | |
| 5,121,338 A | 6/1992 | Lodder | |
| 5,124,932 A | 6/1992 | Lodder | |
| 5,153,140 A | 10/1992 | Langfeld et al. | |
| 5,225,679 A | 7/1993 | Clarke et al. | |
| 5,262,961 A | 11/1993 | Farone | |
| 5,340,210 A | 8/1994 | Patel et al. | |
| 5,348,003 A | 9/1994 | Caro | |
| 5,348,389 A | 9/1994 | Jonsson et al. | |
| 5,446,681 A | 8/1995 | Gethner et al. | |

(Continued)

OTHER PUBLICATIONS

U.S. Appl. No. 11/177,930 to Anderson et al. entitled "Chemical Mixing Apparatus, System and Method."

(Continued)

*Primary Examiner*—David Sorkin
(74) *Attorney, Agent, or Firm*—Meyertons, Hood, Kivlin, Kowert & Goetzel, P.C.; Eric B. Meyertons (57) ABSTRACT

There is disclosed a system and method of formulating a batch comprising at least two ingredients. The ingredients are admitted to a container to partially fill it. The quantities of the ingredient in the container are determined, and a ratio of a target quantity to the determined current quantity for at least one ingredient is calculated. The next quantity of that ingredient to be admitted to the admixture is calculated by multiplying the target quantity by the calculated ratio to determine a corrected quantity. The corrected quantity of the ingredient is admitted to the admixture, and a quantity of another ingredient is admitted to the admixture to adjust the proportion of ingredients to the target formulation. These steps may be repeated until the batch is completed.

11 Claims, 6 Drawing Sheets

U.S. PATENT DOCUMENTS

| | | | |
|---|---|---|---|
| 5,452,232 A | 9/1995 | Espinosa et al. | |
| 5,475,612 A | 12/1995 | Espinosa et al. | |
| 5,522,660 A | 6/1996 | O'Dougherty et al. | |
| 5,586,066 A | 12/1996 | White et al. | |
| 5,592,402 A | 1/1997 | Beebe et al. | |
| 5,606,164 A | 2/1997 | Price et al. | |
| 5,632,960 A | 5/1997 | Ferri, Jr. et al. | |
| 5,712,797 A | 1/1998 | Descales et al. | |
| 5,740,073 A | 4/1998 | Bages et al. | |
| 5,763,883 A | 6/1998 | Descales et al. | |
| 5,874,049 A | 2/1999 | Ferri, Jr. et al. | |
| 5,924,794 A | 7/1999 | O'Dougherty et al. | |
| 5,982,486 A | 11/1999 | Wang | |
| 6,012,019 A | 1/2000 | Saby | |
| 6,050,283 A | 4/2000 | Hoffman et al. | |
| 6,070,128 A | 5/2000 | Descales et al. | |
| 6,100,526 A | 8/2000 | Mayes | |
| 6,117,601 A | 9/2000 | Kanazawa et al. | |
| 6,120,175 A | 9/2000 | Tewell | |
| 6,159,255 A | 12/2000 | Perkins | |
| 6,179,954 B1 | 1/2001 | Kawana et al. | |
| 6,290,384 B1 | 9/2001 | Pozniak et al. | |
| 6,421,614 B1 | 7/2002 | Goldman et al. | |
| 6,438,440 B1 | 8/2002 | Hayashi | |
| 6,445,969 B1 | 9/2002 | Kenney et al. | |
| 6,464,799 B1 | 10/2002 | Lerner et al. | |
| 6,507,401 B1 | 1/2003 | Turner et al. | |
| 6,604,849 B2 | 8/2003 | Lin et al. | |
| 6,630,672 B1 | 10/2003 | Brotherton et al. | |
| 6,665,576 B2 | 12/2003 | Hayashi | |
| 6,681,187 B2 | 1/2004 | Ishii et al. | |
| 6,707,556 B2 | 3/2004 | Turner et al. | |
| 6,732,017 B2 * | 5/2004 | Pham et al. | 700/265 |
| 6,762,832 B2 | 7/2004 | Fisher et al. | |
| 6,766,275 B2 | 7/2004 | Samata et al. | |
| 6,772,781 B2 | 8/2004 | Doty et al. | |
| 6,799,883 B1 | 10/2004 | Urquhart et al. | |
| 6,862,484 B2 | 3/2005 | Hayashi | |
| 6,969,190 B1 * | 11/2005 | McClain et al. | 366/141 |
| 2002/0143719 A1 | 10/2002 | Yoshihara | |
| 2002/0155541 A1 | 10/2002 | Naughton et al. | |
| 2002/0156549 A1 | 10/2002 | Hayashi | |
| 2002/0188367 A1 | 12/2002 | Hayashi | |
| 2003/0023390 A1 | 1/2003 | Ishii | |
| 2003/0050736 A1 | 3/2003 | Nelson et al. | |
| 2003/0095472 A1 | 5/2003 | Fukui | |
| 2003/0199649 A1 | 10/2003 | Orbison et al. | |
| 2003/0233198 A1 | 12/2003 | Taguchi et al. | |
| 2004/0007180 A1 | 1/2004 | Yamasaki et al. | |
| 2004/0009162 A1 | 1/2004 | Pfaff et al. | |
| 2004/0034479 A1 | 2/2004 | Shimase et al. | |
| 2004/0098161 A1 | 5/2004 | Hayashi | |
| 2004/0100860 A1 | 5/2004 | Wilmer et al. | |
| 2004/0199293 A1 | 10/2004 | Pham et al. | |
| 2004/0215424 A1 | 10/2004 | Taguchi et al. | |
| 2004/0228186 A1 | 11/2004 | Kadota | |
| 2004/0236522 A1 | 11/2004 | Howes et al. | |
| 2006/0080041 A1 | 4/2006 | Anderson et al. | |
| 2007/0043471 A1 | 2/2007 | Anderson et al. | |
| 2007/0043472 A1 | 2/2007 | Anderson et al. | |
| 2007/0043473 A1 | 2/2007 | Anderson et al. | |
| 2007/0106425 A1 | 5/2007 | Anderson et al. | |

OTHER PUBLICATIONS

U.S. Patent and Trademark Office, "Communication", U.S. Appl. No. 11/484,014, mailed May 14, 2007; available in PAIR.

Co-Pending U.S. Appl. No. 10/593,548 entitled "Chemical Mixing Apparaatus System and Method" to Simpson et al. filed Sep. 19, 2006; Available in PAIR.

PCT Search Report and Written Opinion for International Application No. PCT/US2006/026687 mailed Jan. 4, 2007; 10 pages.

PCT Search Report for International Application No. PCT/US04/41053 mailed May 23, 2005, 1 page.

U. S. Patent and Trademark Office, "Communication", for U.S. Appl. No. 11/484,019, mailed May 14, 2007; available in PAIR.

U. S. Patent and Trademark Office, "Communication", for U.S. Appl. No. 11/484,021, mailed May 14, 2007; available in PAIR.

U. S. Patent and Trademark Office, "Communication", for U.S. Appl. No. 11/484,020, mailed May 14, 2007; available in PAIR.

* cited by examiner

CHEMICAL MIXING APPARATUS

RELATED APPLICATIONS

This application hereby claims priority to, and incorporates by reference in its entirety, a U.S. provisional patent application entitled CHEMICAL MIXING APPARATUS, SYSTEM AND METHOD, filed Jul. 8, 2004.

FIELD OF THE INVENTION

The present invention relates in general to an apparatus, system and method for mixing chemicals. It more particularly relates to such an apparatus, system and method for mixing ingredients in a precise manner in accordance with a given recipe.

BACKGROUND ART

This section describes the background of the disclosed embodiment of the present invention. There is no intention, either express or implied, that the background art discussed in this section legally constitutes prior art.

There have been a variety of different types and kinds of apparatus, system and methods for mixing ingredients. For example, reference may be made to the following U.S. patents and patent application, each of which is incorporated herein by reference in its entirety:

| U.S. Pat. No. | Inventor | Issue Date |
| --- | --- | --- |
| 4,363,742 | Stone, Milton | Dec. 14, 1982 |
| 5,340,210 | Patel, et al. | Aug. 23, 1994 |
| 5,348,389 | Lennart Jönsson, et al. | Sep. 20, 1994 |
| 5,522,660 | O'Dougherty, et al. | Jun. 04, 1996 |
| 5,632,960 | Ferri, J. R., et al. | May 27, 1997 |
| 5,874,049 | Ferri, J. R. et al. | Feb. 23, 1999 |
| 5,924,794 | O'Dougherty, et al. | Jul. 20, 1999 |
| 6,120,175 | Tewell, Stanley | Sep. 19, 2000 |
| 6,290,384 | Pozniak, et al. | Sep. 18, 2001 |
| 2004/0100860 | Wilmer, et al. | May 27, 2004 |

Currently, many manufacturing processes require the use of blended chemical compositions to treat parts during different steps of the process. Historically, these blended compositions have depended upon the input chemical control devices to achieve the desired mixture, then the mixture is tested in line for acceptable use. In some cases, an external analytical instrument or laboratory is used to confirm the blended mixture. In some other cases, an in-line test on the product is used.

While these methods may be successful for some applications to assure quality of process, they each may employ unwanted and undesirable delays. If the test fails, draining and refilling the chemistry subsequent to the test results may be required. This may result in unacceptable delays, additional costs and additional cycle time to the manufacturing process in certain applications.

BRIEF DESCRIPTION OF THE DRAWINGS

The following is a brief description of the drawings.

DETAILED DESCRIPTION OF CERTAIN EMBODIMENTS OF THE INVENTION

According to certain embodiments of the invention, there is provided a system and method of formulating a batch comprising at least two ingredients. The ingredients are admitted to a container to partially fill it. The quantities of the ingredient in the container are determined, and a ratio of a target quantity to the determined current quantity for at least one ingredient is calculated. The next quantity of that ingredient to be admitted to the admixture is calculated by multiplying the target quantity by the calculated ratio to determine a corrected quantity. The corrected quantity of the ingredient is admitted to the admixture, and a quantity of another ingredient is admitted to the admixture to adjust the proportion of ingredients to the target formulation. These steps may be repeated until the batch is completed.

According to certain embodiments of the invention, there is provided a fractional fill mixing apparatus, system and method for mixing ingredients. In one disclosed embodiment, the fractional fill apparatus, system and method includes a container for holding ingredients, an in-line analytical instrument for measuring the concentration or quantity of ingredients disposed within the container, and an ingredient supply control device for dispensing ingredients into the container. A controller is operatively connected to the ingredient supply control device and the analytical instrument. The controller further employs a fractional fill algorithm for admitting at least two ingredients to the container to a fraction of the full volume for a desired batch.

According to certain embodiments of the invention, a controller executes the fractional fill mixing algorithm to cause an initial fraction of the total volume of the container to be filled in the filling sequence. This fractional volume is recirculated to assure a homogeneous mixture, and the in-line analytical instrument determines the constituent parts of the mixture and communicating that information regarding the current mixture to the controller. The controller executing a fractional fill mixing algorithm, adjusts the ingredient supply control device in a manner that corrects errors between the actual values and the desired values of the mixture in subsequent fractions or portions of the total volume of the mixture. The resulting blend is the desired mixture and no additional testing is required for many applications.

Figure 1:
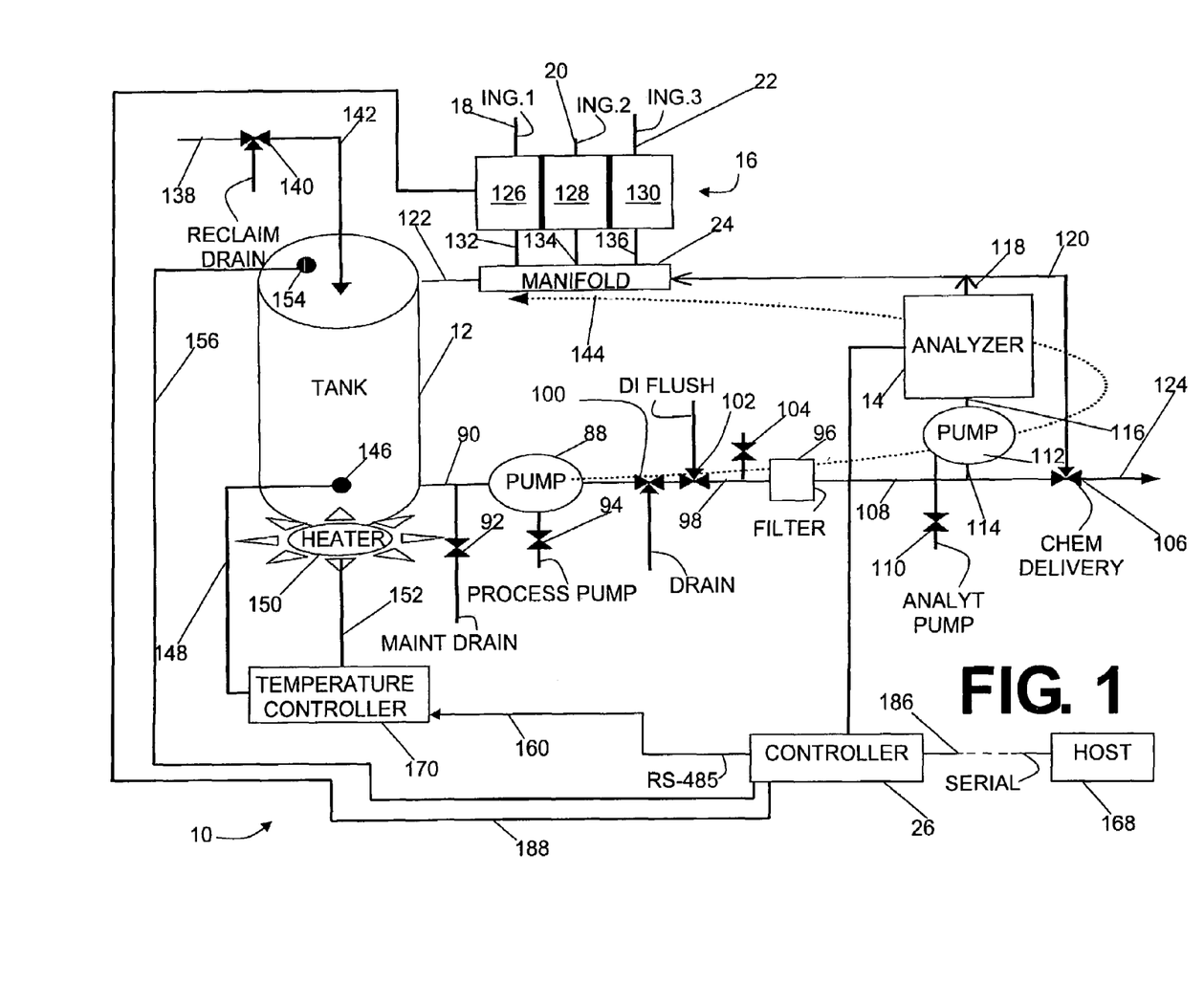
FIG. 1 is a diagrammatic view of a chemical mixing system which is constructed in accordance with an embodiment of the invention.

Referring now to the drawings and, more particularly, to FIG. 1, there is shown a fractional fill mixing apparatus or system 10, which is constructed in accordance with an embodiment of the present invention, and which is used to mix two or more ingredients in a tank or container 12. An analyzer or analytical instrument 14 is adapted to measure the quantities of each ingredient in the container 12. An ingredient supply control device shown generally at 16, controllably dispenses two or more ingredients into the tank or container 12. The ingredient supply control device 16 dispenses ingredients through a plurality of ingredient supply inlets, such as first ingredient supply inlet 18, second ingredient supply inlet 20, and third ingredient supply inlet 22. Each ingredient supply inlet 18, 20, and 22, are connected in fluid communication with a plurality of ingredient supplies (not shown). The manifold 24 receives the plurality of ingredients from ingredient supply control device 16. The ingredients then flow from the manifold 24 to the container 12.

Figure 2:
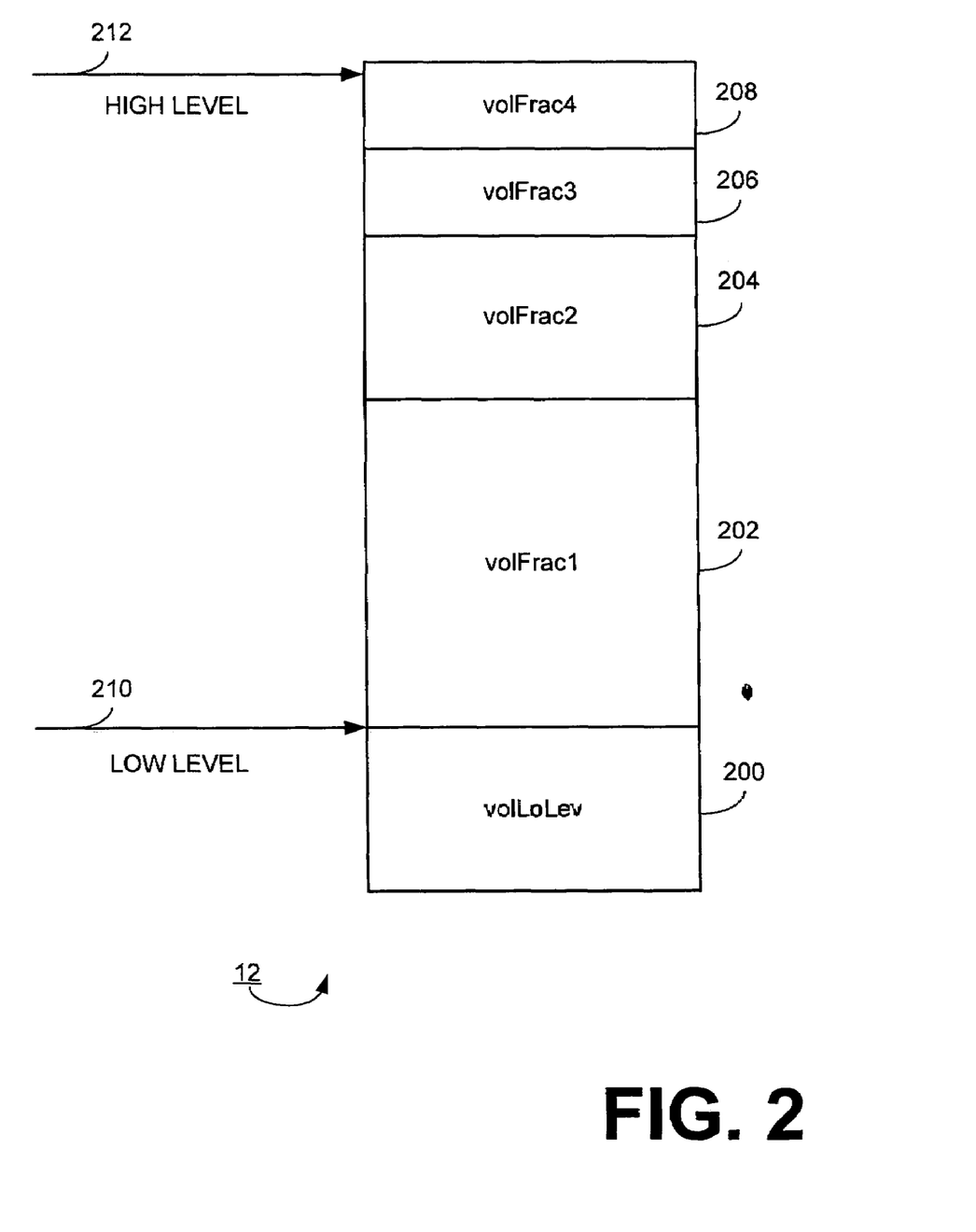
FIG. 2 is a diagrammatic front elevational view of a tank being filled using a fractional fill method in accordance with the system of FIG. 1.

As shown in FIG. 2, in use, according to a fractional fill mixing algorithm, the tank or container 12 initially may contain a residual volume of one of the plurality of ingredients to be mixed, as indicated by volLowLev 200. The low level of the tank is, therefore, indicated generally at 210 when a residual volume of one of the ingredients is present in the tank 12.

According to an embodiment of the invention, the tank 12 is then fractionally filled seriatim through two or more fractional or partial filling sequences, the volume of each are indicated at 202, 204, 206, and 208, respectively. As indicated in FIG. 2, for example, a fractional filling sequence generally may comprise four fractional filling sequences volFrac1, volFrac2, volFrac3, and volFrac4. It should be noted that the tank or container 12 may have additional volume capacity above the high level point 212 (not shown). Thus, the high level point 212 indicates the level that will be achieved when the fractional fill sequence is complete but not necessarily indicate the maximum capacity of the tank 12.

Figure 3:
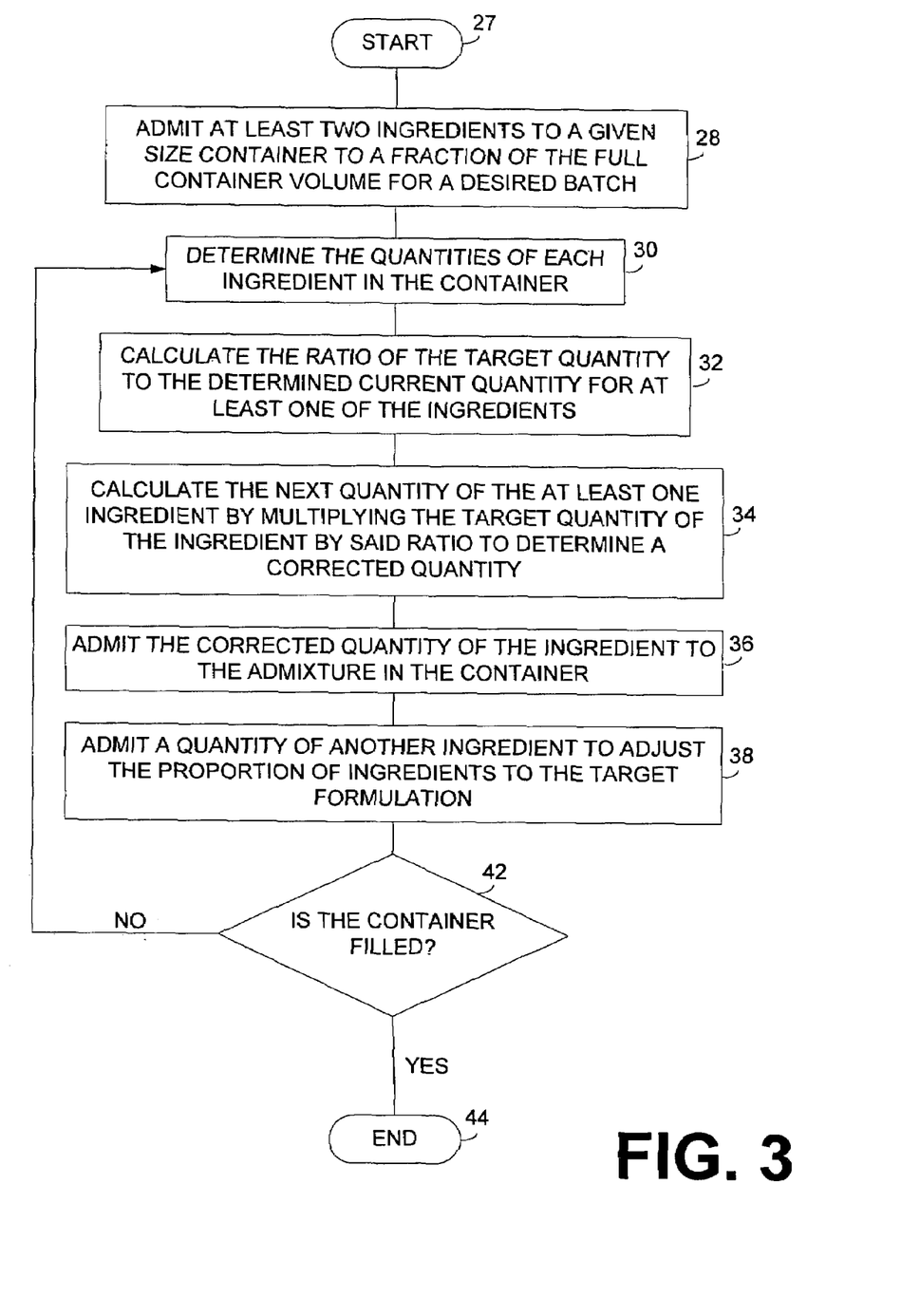
FIG. 3 is a flow chart of a fractional fill mixing method, which may be utilized with the system of FIG. 1.

As shown in FIG. 3, the fractional fill mixing method begins in block 27. The fractional fill mixing method admits at least two ingredients to the container 12 to a fraction of the full container 12 volume for a desired batch. The method then determines the quantities of each ingredient in the container as shown generally in block 30. The quantities of each ingredient measured in the container 12 may be in percent by weight or in percent by volume. The method then calculates the ratio of the target quantity for the desired mixture to the determined current quantity for at least one of the ingredients as measured in block 30. This step is generally shown in block 32. As shown in block 34, the method then calculates the next quantity of at least one ingredient by multiplying the target quantity of the ingredient by the ratio calculated in block 32 to determine a corrected quantity. As shown in block 36, the method then directs the ingredient supply control device 16 to admit the corrected quantity of the ingredient to the admixture in the container 12. The method, as shown in block 38, then admits a quantity of another ingredient to adjust the proportion of the ingredients to the target formulation. Steps as shown in blocks 30, 32, 34, 36, and 38 are repeated until the container is filled to the desired quantity of the batch. When the container 12 is filled to the desired quantity of the batch, the process terminates as shown in block 44.

Considering now the method as just described in greater detail, and with reference to FIG. 2, the method includes determining a desired fractional filling sequence of quantities of fractional fills to be performed. For example, FIG. 2 shows a tank 12 that will contain the admixture and ultimately the final desired batch to be created from the method. FIG. 2 shows a plurality of volume levels for subsequent fractional fill sequences. In the present example, four fractional filling sequences are to be performed. The first fractional filling sequence fills the container 12 to approximately 50% of its volume as shown by area 202 and this volume is indicated as volFrac 1. The partial fill volume is equal to 50% in this example including the residual volume as indicated by volLowLev 200. The residual volume is the volume of a residual ingredient already present in the tank 12 before the fractional fill method is commenced. There may or may not be a residual volume, as it depends on the user requirements. The residual volume of the ingredient in tank 12 is normally the same ingredient as one of the ingredients that will form part of the current batch. The second fractional fill fills the container an additional 25% of volume as indicated by the area 204 where the volume for this fractional fill is represented by volFrac 2. The third and fourth fractional volumes, volFrac 3 and volFrac 4 indicated by 206 and 208, respectively, each fill the container an additional 12.5% until the container is approximately full as indicated by arrow 212.

The fractional volumes and percentages just recited are for example purposes only and could be modified as desired to achieve various filling sequences as will become apparent to those skilled in the art. For example, instead of four fractional filling sequences, three fractional filling sequences could be used where each fractional volume sequence could include 33% or one-third of the approximate container volume. For sake of example only, subsequent discussions of the fractional filling method will utilize four fractional filling sequences. The first fractional filling sequence, volFrac 1, will be equal to 50% of the total batch volume, the second fractional filling sequence, volFrac 2, will contain 25% of the total batch volume, and the third and fourth fractional filling sequences, volFrac 3 and volFrac 4, will each contain 12.5% each of the total batch volume as described previously.

Thus, the total volume of the batch in container 12 is represented by the variable totalVol which equals (VolLowLev+volFrac 1+volFrac 2+volFrac 3+volFrac 4). totalVol may also be represented by (chem1TotalVol+chem2TotalVol+diwAddedVol). chem1TotalVol represents the total volume of the first ingredient in the batch. chem2TotalVol represents the total volume of the second ingredient in the batch. DiwAddedVol represents the volume of the third ingredient, typically deionized water, added to VolLowLev. It should be noted that diwAddedVol represents the third ingredient and normally is deionized water but may be any other ingredient that is desired to be part of the batch. To sake of clarity for subsequent examples, the residual volume of the ingredient in container 12 is defined as being the same ingredient as diwAddedVol, the third ingredient of a desired batch, so that when diwAddedVol and VolLowLev are combined, the total volume of the third ingredient results.

The fractional fill mixing method then begins by filling the container to the first fractional fill percentage in the sequence. In our example, this is 50% as represented by VolFrac1 202, as best shown in FIG. 2. The actual volume of the first ingredient to meet the requirements for the current fractional fill sequence is then calculated. This volume is represented by chem1FracVol. chem1FracVol is equal to chem1TotalVol·pourUp1Frac where pourUp1Frac is a fractional fill percentage of the first fill sequence, in the present example, 50%. chem2FracVol is calculated using a similar formula.

Calculation of the total volume of the first ingredient must then be calculated as represented by chem1TotalVol. chem1TotalVol is defined as chem1Ratio·x where x is an intermediate variable. x is defined as TotalVol÷(chem1Ratio+chem2Ratio+diwRatio). chem1Ratio and chem2Ratio are defined as the ratio of the volume to be filled for the first and second ingredients, respectively. diwRatio is a ratio of the volume to be filled for the third ingredients.

The volume of the third ingredient added to VolLowLev to obtain totalVol is defined as diwAddedVol which equals (diwRatio·x)−VolLowLev.

The fractional fill mixing method next includes calculating the target quantity of one ingredient based on the target volumetric blending ratio and the supply concentration of the ingredient. The target quantity of one ingredient is referred to as concChem1, which is defined as (chem1Ratio·bulkChem1)÷(chem1Ratio+chem2Ratio+diwRatio). Where chem1Ratio and chem2Ratio and diwRatio represent the ratios of the volume to be filled for the first, second, and third ingredient, respectively, for the current fractional fill sequence. BulkChem1 represents the supply concentration of the first ingredient. The target quantity of the other ingredients are calculated using similar formulas where the numerator of the above equation is replaced with the ratio and concentration of the bulk ingredient supply from the respective ingredient being calculated. Now that chem1FracVol has been calculated, chem2FracVol and diwFracVol are also calculated as just described.

At this point in the method for fractional fill mixing according to one embodiment of the invention, the first fraction is poured by controller 26 sending a signal to ingredient supply control device 16 to dispense the volume of ingredient represented by chem1FracVol then to dispense the volume of ingredient represented by chem2FracVol and finally to dispense the volume of chemical as represented by diwFracVol.

Now that the first fractional fill has been admitted to container 12, subsequent fractional fill sequences must be calculated and admitted to container 12. To perform the remaining fractional fill sequences, an ideal chemical fraction, such as idealChem1Frac, may be calculated. An ideal chemical fraction may be calculated for each ingredient to be admitted to container 12. By way of example, idealChem1Frac is defined as (chem1TotalVol·pourUp2Frac) where chem1TotalVol represents the total volume of the first ingredient to meet the requirements for the current fractional fill sequence and pourUp2Frac is the subsequent fractional fill percentage in the sequence. For example, since this is the second correction fill sequence, pourUp2Frac in this example would now be equal to 25%. Other ideal chemical fractions may also be calculated for each ingredient by using a similar formula where chem1TotalVol is replaced with the total volume of the other ingredient being evaluated.

Next, the actual volume of each ingredient to meet the requirements for the current fractional fill sequence must be calculated. By way of example, the actual volume of the first ingredient to meet the requirements for the current fractional fill sequence is represented by chem1FracVol which is defined as (idealChem1Frac·concChem1)÷chem1Val where chem1Val is the measured quantity or concentration of the first ingredient in the batch. A similar formula may be used to calculate the actual volumes of the other ingredients to be added to the admixture during this fractal fill sequence where the theoretical quantity/concentration of the other ingredients, ideal chemical fractions, and measured quantities/concentrations may be replaced in the appropriate portions of the above formula.

The method further includes calculating the difference between the ideal and actual volume of the first ingredient. This is calculated by subtracting chem1FracVol from idealChem1Frac. The same formula is used for the second ingredient to calculate chem2FracDelta using its actual volume to meet the requirements of the current fractional fill sequence and ideal chemical fraction.

The actual volume of the third ingredient to meet the requirements for the current fractional fill sequence may use a different formula. diwFracVol is equal to (diwAddedVol·pourUp2Frac)+chem1FracDelta+chem2FracDelta where diwAddedVol is the volume of the third ingredient at its VolLowLev to obtain total volume for the third ingredient. This, as discussed above, assumes that VolLowLev, which represents the residual volume in the container, is the same ingredient as the third ingredient. chem1FracDelta is defined as the difference between the ideal and actual volume of the first ingredient and chem2FracDelta is defined as the difference between the ideal and actual volume of the second ingredient. Thus, diwFracVol serves to volumetrically fill the remaining volume for the current fractional fill sequence.

As previously stated, diwAddedVol represents the volume of the third ingredient added to VolLowLev to obtain total volume. diwAddedVol is defined as diwRatio·x−VolLowLev where x is defined as (TotalVol÷(chem1Ratio+chem2Ratio+diwRatio)). If it is determined that diwFracVol is negative, diwFracVol is then reduced by multiplying the first ingredient volume to be admitted to the admixture for the current fractional fill sequence by ((totalVol−VolLowLev)·pourUp2Frac)÷(chem1FracVol+chem2FracVol). The volume of the second ingredient is also reduced by multiplying it by the same formula.

It should be noted that the target quantity of one ingredient represented in percent by weight may be modified as a function of specific gravity of each ingredient in the batch. For example, concChem1, by example, may be modified as a function of specific gravity by employing the following replacement formula (chem1Ratio bulkChem1·sGravChem1)÷((chem1Ratio·sGravChem1)+(chem2Ratio·sGravChem2))+(diwRatio·sGravChem3) where concChem1 is the target concentration of the first ingredient, chem1Ratio is a ratio of the volume to be filled for the first ingredient. chem2Ratio is a ratio of the volume to be filled for the second ingredient. diwRatio is the ratio of the volume to be filled for the third ingredient. BulkChem1 is the supply concentration of the first ingredient. sGravChem1, sGravChem2, sGravChem3 represent the specific gravity for the first, second, and third ingredients, respectively.

It should be noted that the above method may be used with concentrated bulk chemicals normally having the concentration measured in percent by weight. Therefore, in the foregoing examples, the formulas listed hereinabove in conjunction with the method for performing fractional fill mixing may use percent by weight concentration as the measure for quantity of the contemplated ingredient in the admixture or from the chemical supply. Alternatively, in other contemplated examples of embodiments of the invention not disclosed herein, percent by volume concentration or other concentration measurement values may be used in some circumstances depending on the type of analytical instrument 14 in use.

Subsequent fractional fill sequences are then calculated and added to the admixture in container 12 using the same formulas and methods stated hereinabove for the foregoing examples.

In one embodiment, the fractional fill mixing apparatus, system, and method may be used for chemical blending or mixing concentrated chemicals for use in the manufacture of semiconductor wafers. Therefore, one of the ingredients to be mixed in the admixture may be $NH_4OH$, $H_2O_2$, or $H_2O$.

By way of example, the above mentioned equations may be used to demonstrate how the fractional fill mixing method is employed. For this example, assume that it is desired to create a batch that contains three ingredients. The first two ingredients are named the ("first ingredient") and the ("second ingredient"). The third ingredient will be deionized water, abbreviated ("diw"). For example, it will be assumed that each ingredient has a specific gravity equal to one. Also for the purposes of this example, it is desired that the ingredients be blended together so that a volumetric ratio of 1:1:100 be achieved where the first ingredient forms one part represented by the variable chem1Ratio, the second ingredient forms one part represented by the variable chem2Ratio and the diw forms 100 parts of the batch represented by the variable diwRatio.

For this example, a 10,000 mL tank 12 will be completely filled with the ingredients. In this example assume, for sake of clarity, that there is no residual volume of diw present in the container. Therefore, the variable VolLowLev will be equal to zero in all of the equations. The total volume of the batch to be created is represented by the variable totalVol is equal to (chem1TotalVol+chem2TotalVol+diwAddedVol) where chem1TotalVol is the total volume of the first ingredient for the batch. chem2TotalVol is the total volume of the second ingredient to meet the requirements for the batch and diwAddedVol is the volume of diw to be added to VolLowLev to meet the requirements for the batch.

Thus, the equation to calculate chem1TotalVol=chem1Ratio·(totalVol÷(chem1Ratio+chem2Ratio+diwRatio)). Plugging in the numbers from our example, chem1TotalVol=1·(10,000÷(1+1+100))=98 mL. Using similar formulas, chem2TotalVol=chem2Ratio·(totalVol÷(chem1Ratio+chem2Ratio+diwRatio)). Inserting the numbers from the present example, chem2TotalVol=1·(10,000÷(1+1+100))=98 mL.

diwAddedVol which represents the volume of diw to be added to VolLowLev has a slightly different formula to account for the residual volume of diw in the tank 12. diwAddedVol=diwRatio·(totalVol÷(chem1Ratio+chem2Ratio+diwRatio))−volLowLev. Inserting the numbers from the present example, diwAddedVol=100·(10,000÷(1+1+100))−0=9804 ml.

Therefore, the volume of the batch which equals totalVol also equals (chem1TotalVol+chem2TotalVol+diwAddedVol). Inserting the numbers from the present example, totalVol=(98 mL+98 mL+9804 ml)=10,000. 10,000 mL is also the size of the container 12 that will be completely filled to verify that the calculations are correct.

The desired number of fractional filling sequence is then determined to be performed and the relative fill percentages to accompany each fill sequence. The number of fractional filling sequences and their relative percentages of fill are chosen by the operator. It has been found that this method works well for some applications with four filling sequences where the first sequence fills the container 12 with 50% of the target volume of the completed mixture. This value is assigned to pourUp1Frac. The second sequence fills the container 12 with 25% of the target volume of the completed mixture. This is assigned to variable pourUp2Frac. The third and fourth sequences fill the container 12 each with 12.5% of the target volume of the completed mixture. These values are assigned to pourUp3Frac and pourUp4Frac, respectively. Other quantities of filling sequences and their percentages may be chosen by the operator and may be modified to obtain improved results through experimentation.

In the next step in the method, the concentrations of the bulk supply for each of the ingredients are determined and will be added to the admixture. For this example, assume that the bulk supply of the first ingredient has a concentration of 29% by weight and the bulk supply of the second ingredient has a concentration of 30% by weight. diw, being pure water, in this example, is assumed to be 100% pure. These bulk concentrations may be printed on the material data sheets for the chemicals or ingredients.

The target concentration of the first two ingredients is then calculated. The fractional fill method of this example will attempt to formulate the batch to achieve the target concentrations of the first and second ingredients. These target concentrations are represented by the variables concChem1, concChem2 where concChem1 represents the target concentration of the first ingredient and concChem2 represents the target concentration of the second ingredient. The target concentration of diw is not normally calculated as diw is generally used fill the remainder of volume for a fractional fill when the first two ingredients are added to the admixture. Note that concentration may be measured as a quantity or in percent by weight or volume where either may be used in the formulas.

The variable concChem1 is then calculated by the following formula concChem1=(chem1Ratio·bulkChem1)÷(chem1Ratio+chem2Ratio+chem3Ratio). The variable concChem2 is then calculated by the following formula conceChem2=(chem2Ratio·bulkChem2)÷(chem1Ratio+chem2Ratio+chem3Ratio). Thus, plugging in the numbers from our example, concChem1=(1·29%)÷(1+1+100)=0.284% and concChem2=(1·30%)÷(1+1+102)=0.294%. Note that the specific gravity of each ingredient was not factored into this equation and was assumed to be equal to one for each ingredient.

In the present example, the next step in the method is to calculate the theoretical volumes of each ingredient to be added to the tank 12 for the first fractional fill sequence where, in this step, chem1FracVol represents the actual volume of the first ingredient to meet the requirements for the current or first fractional fill sequence. Chem2FracVol represents the actual volume of the second ingredient to meet the requirements for the current or first fractional fill sequence. diwFracVol represents the actual volume of diw to meet the requirements for the current or first fractional fill sequence.

To calculate chem1FracVol, the following equation is used: chem1FracVol=chem1TotalVol·pourUp1Frac. Plugging in the numbers from the present example, chem1FracVol=98 mL·50%=49 ml. Chem2FracVol=chem2TotalVol·pourUp1Frac. Inserting the numbers from the present example, chem2FracVol=98 mL·50%=49 ml. Finally, diwFracVol=diwAddedVol·pourUp1Frac. Inserting the numbers from the present example, diwFracVol=9804 mL·50%=4902 ml The method of this embodiment, as now best shown in FIG. 3 at step 28, the ingredients are admitted to the container 12 to a fraction of the full container volume for the first fractional fill sequence. In this example, the container 12 is then filled with 49 mL of the first ingredient, 49 mL of the second ingredient, and 4902 mL of diw. The first fractional fill sequence is now complete.

Depending on what type of ingredient supply control device 16 is employed, the controller 26 may drive the supply control device 16 to dispense the required amount of ingredients using suitable equipment, such as pumps or gravity feed dispensing devices for flow controllers or others. For pumps, for example, the number of strokes of the pump may be conventionally calculated by the controller 12 and for gravity fed dispensing devices, the dispensing time may be conventionally calculated by the controller 12.

The next step in the method 30 requires that the quantities/concentration of each ingredient in the admixture be determined. An analytical instrument 14 may be utilized for this purpose. For this example, assume that the analytical instrument 14 can measure the quantities of each ingredient in the admixture in percent by weight which is why the target quantities/concentration for each ingredient is calculated in percent by weight. For the present example, assume that the measured quantity/concentration of the first ingredient is measured at 0.210% by weight which is assigned to variable chem1Val and the measured quantity/concentration of the second ingredient is measured at 0.294% by weight which is assigned to variable chem2Val.

As shown in FIG. 3, step 32 in the disclosed example of the method, the second and all subsequent fractional fill sequences are prepared and, in the present example, the ratio of the target quantity/concentration to the measured quantity/concentration of each ingredient in the admixture is required to be calculated. In step 34 of this example, the next quantity of each of the ingredients is calculated by multiplying the target quantity by the ratio calculated for each respective ingredient in step 32 to determine a corrected quantity. That corrected quantity for each ingredient is then added to the admixture.

The method of the present example for accomplishing this involves calculating a series of variables, idealChem1Frac, idealChem2Frac which represent intermediate variables to ultimately obtain chem1FracVol, chem2FracVol, and diw-FracVol which represent the corrected volumes of ingredient that shall be added to the admixture to correct the quantities/concentrations of the ingredients in the admixture for the current fractal fill sequences. Thus, variable idealChem1Frac is defined as being equal to chem1TotalVol·pourUp2Frac. Using the numbers from the present example, idealChem1Frac=98 mL·25%=24.5 mL. The variable idealChem2Frac=chem2TotalVol·pourUp2Frac. Using the numbers from the present example, idealChem2Frac=98 mL·25%=24.5 mL.

Now that idealChem1Frac and idealChem2Frac have been calculated, chem1FracVol and chem2FracVol are then calculated. chem1FracVol is equal to (idealChem1Frac·concChem1)÷chem1Val. Thus, using the numbers from the present example, chem1FracVol=(24.5 mL·0.284%)÷0.210%=33.1 mL. chem2FracVol is equal to (idealChem2Frac·concChem2)÷chem2Val. Thus, using the numbers from the present example, chem2FracVol=(24.5 mL·0.294%)÷0.294%=24.5 mL.

Now that chem1FracVol and chem2FracVol are calculated, chem1FracDelta and chem2FracDelta are then calculated and represent the difference between the ideal and actual volumes of the first and second ingredients, respectively. chem1FracDelta equals idealChem1Frac−chem1FracVol and chem2FracDelta equals idealChem2Frac−chem2FracVol. Thus, using the numbers in the present example, chem1FracDelta=24.5 mL−33.1 mL=−8.6 mL and chem2FracDelta=24.5 mL−24.5 mL=0 mL.

In the present example, the variable diwFracVol may now be calculated. diwFracVol is equal to (diwAddedVol·pourUp2Frac)+chem1FracDelta+chem2FracDelta. Thus, using the numbers in the equation, diwFracVol=(9804 mL·25%)+−8.6 mL+0 mL=2442.4 mL.

In accordance with the embodiment of the invention according to the present example, the corrected fractional volumes of each ingredient for the current fractional fill sequence have been calculated, they are admitted into the admixture in accordance with steps 36 and 38 as shown in FIG. 3. For example, 33.1 mL of the first ingredient is added to the admixture, 24.5 mL of the second ingredient is added to the admixture, and 2442.4 mL of diw is also added to the admixture for the current fractal fill sequence.

It should be noted that if diwFracVol was less than zero, then chem1FracVol and chem2FracVol exceed the volume for the current fractional fill sequence. In this situation, chem1FracVol and chem2FracVol are reduced to provide the correct volume for the fraction. Each variable is reduced by multiplying itself by the following fraction ((totalVol−volLowLev)·pourUp2Frac)÷(chem1FracVol+chem2FracVol).

Step 42 as shown in FIG. 3 determines if the container is filled with the desired quantity of the total batch. In the present example, this would occur when all of the fractional fill sequences are completed. If not, then the next fractional fill sequence is begun at step 30. If all of the fractional fill sequences are completed, the method terminates at step 44.

Figure 4:
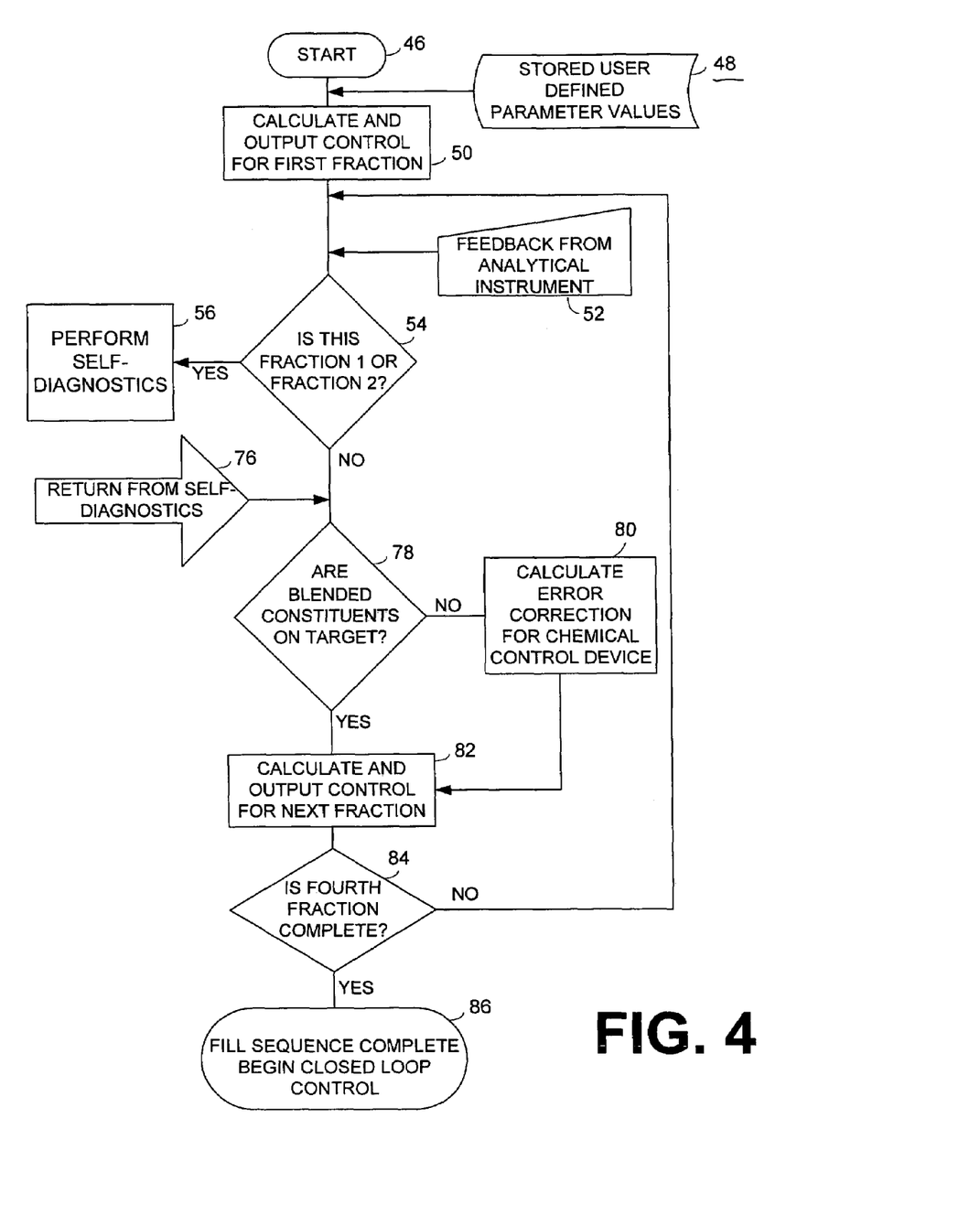
FIGS. 4 and 5 are flow charts of another fractional fill mixing method, which may be utilized with the system of FIG. 1.
Figure 5:
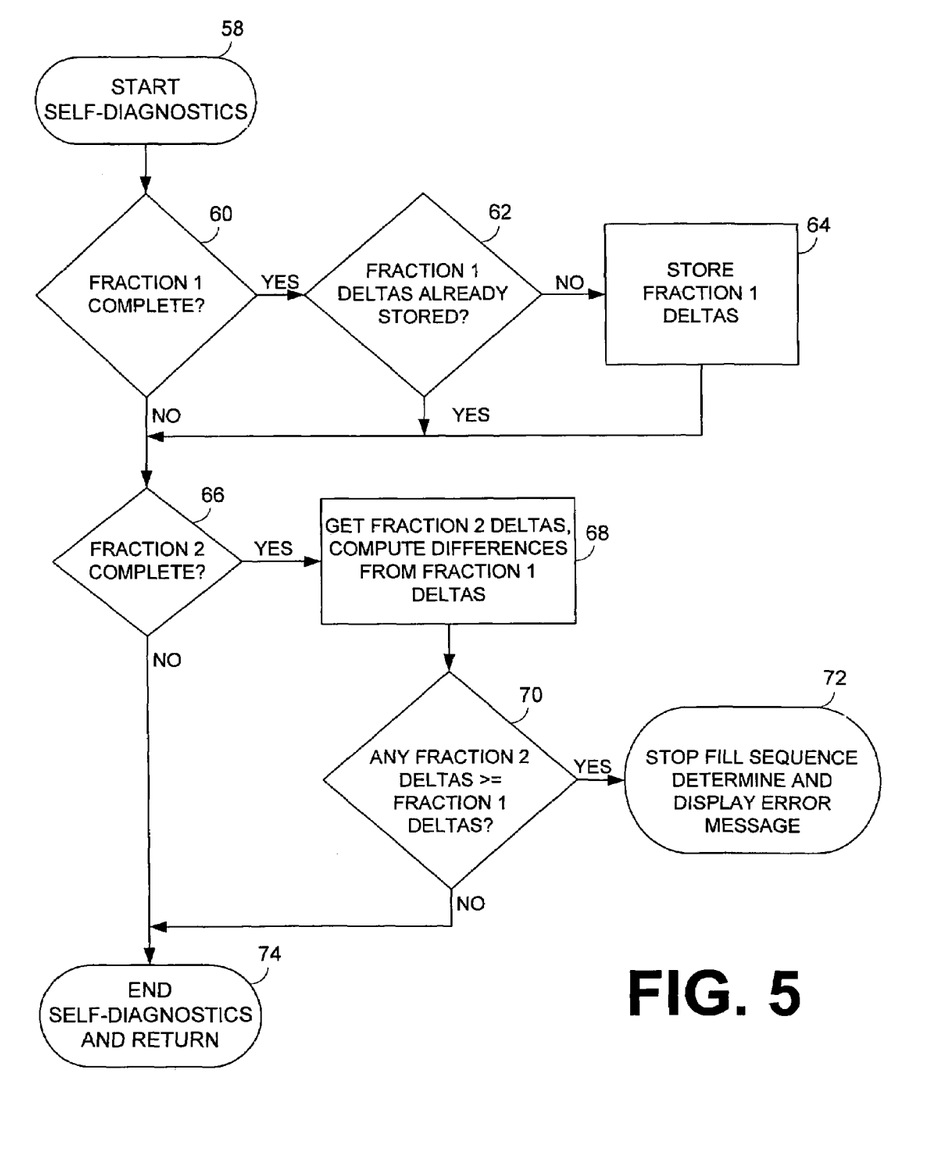

With reference to FIGS. 4 and 5, there is shown another embodiment of the present invention which includes a fractional fill method incorporating self diagnostics. The method of this embodiment begins at step 46 as best shown in FIG. 4. Stored user-defined parameter values are gathered by the controller 12 for subsequent use within the fractional fill method. These user-defined parameter values may include the number of fractional fill sequences to be performed, and the relative fill volume percentages. The user-defined parameter values may also include information such as concentration information regarding the bulk ingredients to be added to the admixture.

The next step in the method, as shown in step 50, calculates the proper volumes of ingredients to be added to the admixture for the first fractional fill sequence. Those ingredients are then added to the admixture. Feedback from an analytical instrument such as the analytical instrument 14 provides the quantity, expressed in a percent by weight, or percent by volume concentration or other, of each of the ingredients in the admixture stored in the tank 12 for the first fractional fill sequence. A decision is then made whether the method is within the first fractional fill sequence or the second fractional fill sequence. If this is true, self-diagnostics are then performed.

As best seen in FIG. 5, self-diagnostics begin at step 58. The method of the example then evaluates whether or not the first fractional fill sequence was complete. If it was complete, the determination is made whether or not the first fractional sequence delta values are already stored. The first fractional fill sequence delta values comprise the difference between the theoretical volumes of the ingredients that should be dispensed into the admixture compared to a revised volume for an ingredient that may be admitted to the admixture due to a variance detected by the analytical instrument 14.

If those fractional filled delta values are not already stored, the controller 26 stores those fractional delta values. The method as executed by controller 26 then makes a decision at box 66 as best shown in FIG. 5 and determines whether the second fractional fill sequence is complete. If not, the self-diagnostics method is terminated at step 74 and the method then returns to the method as shown in FIG. 4 at 76. If the second fractional fill sequence has been completed, step 68 is then performed where the second fractional fill delta values are captured and the differences between the first fractional fill delta values and the second fractional filled delta values are then calculated.

As shown in box 70, according to this embodiment, if any of the second fractional fill delta values are greater than or equal to the first fractional filled delta values, then step 72 is performed which stops the filling sequence and displays an error message. This result occurs when the fractional fill method is unable to correct any deviation in ingredient concentration or quantity between the first fractional fill sequence and the second fractional fill sequence. In other words, if a deviation or delta is discovered in any of the ingredients for the first fractional fill and then a corrective partial fill of ingredients is added in the second fractional fill sequence, assume that it is discovered that the deviation or delta of any of the ingredients did not decrease between the first fractional fill sequence and the second fractional fill sequence. In that case, the fractional fill method is then deemed to be unable to complete the creation of the desired batch.

Referring back to decision box 70 on FIG. 5, if any of the second fractional fill delta values are not greater than or equal to the first fractional fill delta values then the self-diagnostics method terminates at step 74 and returns to the fractional fill method as shown on FIG. 4 at 76.

Referring now to FIG. 4, decision box 78 evaluates whether the blended constituents are on target. In other words, the analytical instrument 14 analyzes the quantity, percent by weight, percent by volume concentration or other, of the chemical constituents depending on the example in the admixture. If they are not on target, an error correction is then calculated for the subsequent fractional fill sequence as described previously. This calculation is performed in step 80 and step 82. If the blended constituents are on target, then the method immediately transfers to step 82 where the volumes for each ingredient are then calculated for the subsequent fractional fill sequence without having any error correction applied.

The method of the present embodiment, as shown in FIG. 4, then proceeds to decision box 84 to determine if the fourth fraction is complete. It should be understood that if the stored user-defined parameter values in step 48 call for less or more than four fractional fill sequences, decision box 84, evaluates whether all of the desired fractional fill sequences have been completed.

If the fourth or final fractional fill has been completed, then the method of the present embodiment terminates at step 86 where closed loop control of the admixture in tank 12 may begin.

Considering now the fractional fill mixing apparatus of the disclosed embodiment in greater detail with reference to FIG. 1, an air operated process pump 88 may be used to re-circulate the ingredients in the tank 12 to achieve homogeneity of the mixture. The pump 88 is operatively connected through a solenoid valve 94 to a source of air under pressure. Process pump 88 may be air operated to minimize the risk of any explosions or fires since flammable compounds and ingredients may be flowing through pump 88. Process pump 88 is connected in fluid communication with tank 12 via a conduit 90. A maintenance drain 92 may be in the form of a manual valve for manually performing draining operations from the conduit 90.

A filter 96 is disposed in-line with the pump 88 within the recirculation line of the fractal fill mixing apparatus 10, and a conduit 98 connects the pump 88 to the filter 96. An air operated 3-way valve 102 is connected in the re-circulation line between the pump 88 and the filter 96 via the conduit 98, to permit the re-ionized water from a source of de-ionized water under pressure to enter the conduit 98 for the purpose of flushing out the fractional fill mixing apparatus 10.

A 3-way valve 100 is disposed in line with the valve 102 to permit draining between batches. A valve 104 is also connected in line with the valve 102 for permitting nitrogen gas under pressure to enter the fractional fill mixing apparatus 10. A 3-way valve 106 connected in fluid communication down stream of the filter 96 to selectively permit ingredients stored in tank 12 to be delivered via a conduit 124 to a process chamber (not shown) for utilization of the batch.

A conduit 108 connects the filter 96 in fluid communication with the valve 106, and an analytical pump 112. A valve 110 may be a solenoid valve which permits air under pressure to drive the analytical pump 112. A conduit 114 is connected in fluid communication between the conduit 108 and the pump 112 to re-circulate the mixture from the tank 12.

The analyzer or analytical instrument 14 is connected in fluid communication with the output of the pump 112 via a conduit 116. The analyzer 14 may be a high precision chemical concentration monitor. An example of such a device is the SC-1 monitor manufactured by HORIBA and marketed as model no. CS-131. The analytical instrument or analyzer 14 is connected in fluid communications with a by-pass re-circulation conduit 120 via a conduit 118 to the valve 106, so that the mixture is re-circulated through both the analyzer 14 and the by-pass conduit 120 until the delivery valve 106 is actuated to deliver the batch via the conduit 124, the mixture is re-circulated to the manifold 24.

Manifold 24 is connected in fluid communication to the ingredient supply control device generally indicated at 16 via three conduits 132, 134 and 136. Ingredient supply control device 16 includes three independent ingredient control devices 126, 128 and 130. Each control device is capable of accurately dispensing ingredients from a bulk supply (not shown) into the manifold 24. Ingredient control devices 126, 128 and 130 are each independently fed from the ingredient supply tubes 18, 20, and 22, respectively. Manifold 24 is connected in fluid communication with the tank 12 via a conduit 122.

The ingredient control devices 126, 128, 130 may be any number of control devices such as pumps, gravity feed systems, flow controllers, or other.

A heater 150 heats the ingredients within the tank 12. A bath temperature controller 170 regulates the heater 150 to control the temperature of the admixture in tank 12. The bath temperature controller 170 measures the temperature of the admixture in the tank 12 via a temperature probe 146.

Ingredients supply control device 16 and its individual ingredient control devices 126, 128 and 130 are controlled by the digital outputs of the controller 26 via a cable 188. The controller 26 may be placed in a communicating relationship to a host computer 168 via a cable 186, or indirectly via a master controller (not shown) when a distributed network is desired.

In operation and with reference to FIG. 1, the controller 26 receives a series of recipe parameters from the host computer 168 that describe the desired quantities of each ingredient to be blended together in tank 12. The controller 26 then performs a first fractional fill sequence as previously described. The controller 26 sends commands to the ingredient supply control device 16 to dispense the proper amount of ingredients for the first fractional fill. When this occurs, the ingredient control devices 126, 128 and 130 begin accurately dispensing ingredients from their respective bulk ingredient supplies (not shown) via the conduits 18, 20 and 22, respectively. Each ingredient is then dispensed into the manifold 24 through the conduits 132, 134, and 136. The ingredients are partially mixed in manifold 24 and then supplied to the tank 12 through conduit 122. After the first fractional fill sequence is complete, the analyzer 14 is enabled to measure the quantity/concentration of each of the chemical constituents in the admixture stored in tank 12.

To accomplish this, the pump 88 is activated to recirculate the mixture from the tank 12 by means of the air valve 94 which causes the admixture stored in tank 12 to flow through the conduits 90 and 98 through the filter 96 and through the conduit 108. During this operation, the maintenance drain 92 is closed as well as the drain valve 100, the valve 102 and the valve 104. The valve 106 is also closed. The admixture from tank 12 then continues to flow through the by-pass conduit 120 through the manifold 24 and back into the tank 12. The re-circulation flow of the admixture is generally shown by curved arrow 144. In this regard, the admixture stored in tank 12 is circulated through the various conduits to mix the admixture to create a more homogeneous admixture before the analytical instrument 14 measures its concentration. The analytical pump 112 is then enabled through air valve 110 which pumps some of the admixture from the conduit 108 to flow through the conduit 114 through the pump 112 and through the analytical instrument 14 where the concentration of the mixture may be measured. The admixture then exits the analytical instrument 14 via the conduit 118 to flow through the manifold 24 and into the tank 12 via the conduit 122.

For subsequent fractional fill sequences, the same general method as just described is performed again. In the present example, before subsequent fractional fill sequences are performed, the process pump 88 and analytical pump 112 are both disabled through their respective valves 94 and 110, although for other applications they may not be disabled. Subsequent to the completion of all the fractional fill sequences or at other times, the bath temperature controller 170 may be enabled to control the heater 150 to heat the admixture to a predetermined temperature. This may be required for some admixtures for subsequent use in a manufacturing process or other process or purpose.

After all of the fractional fill sequences are complete, it may be desired for some applications to transfer the admixture stored in the tank 12 to a process chamber (not shown). That may be accomplished by first ensuring that the maintenance drain 92 is closed. The drain 100 is closed, the DI flush valve 102 is closed, and the nitrogen valve 104 is also closed. In this step, however, the valve 106 is now open. Process pump 88 is then enabled through valve 94 which pumps the admixture from the tank 12 through the conduit 90, the pump 88, the conduit 98, the filter 96 and to the conduit 108. Because valve 106 is now open, the admixture then flows through valve 106 and through the conduit 124 where it is delivered to the process chamber or other destination.

A reclaim drain 3-way valve 140 is disposed between conduits, 138 and 142, so that when reclaimed drain valve 140 is open, a recycled admixture may be reclaimed into the tank 12 through conduits 138 and 142 through valve 140. It should be noted that in all other operations of the fractional fill mixing system 10, the reclaim drain valve 140 is normally closed.

In operation the controller 26 communicates to the bath temperature controller 70 through a serial communications line 160 under the RS-485 protocol. Likewise, the controller 26 may also communicate to the ingredient supply control device 16 and its individual ingredient control devices 126, 128 and 130 through the digital serial line 188, or through an analog signal source, if desired. The controller 26 may communicate to the host computer 168 through another serial connection 186.

Figure 6:
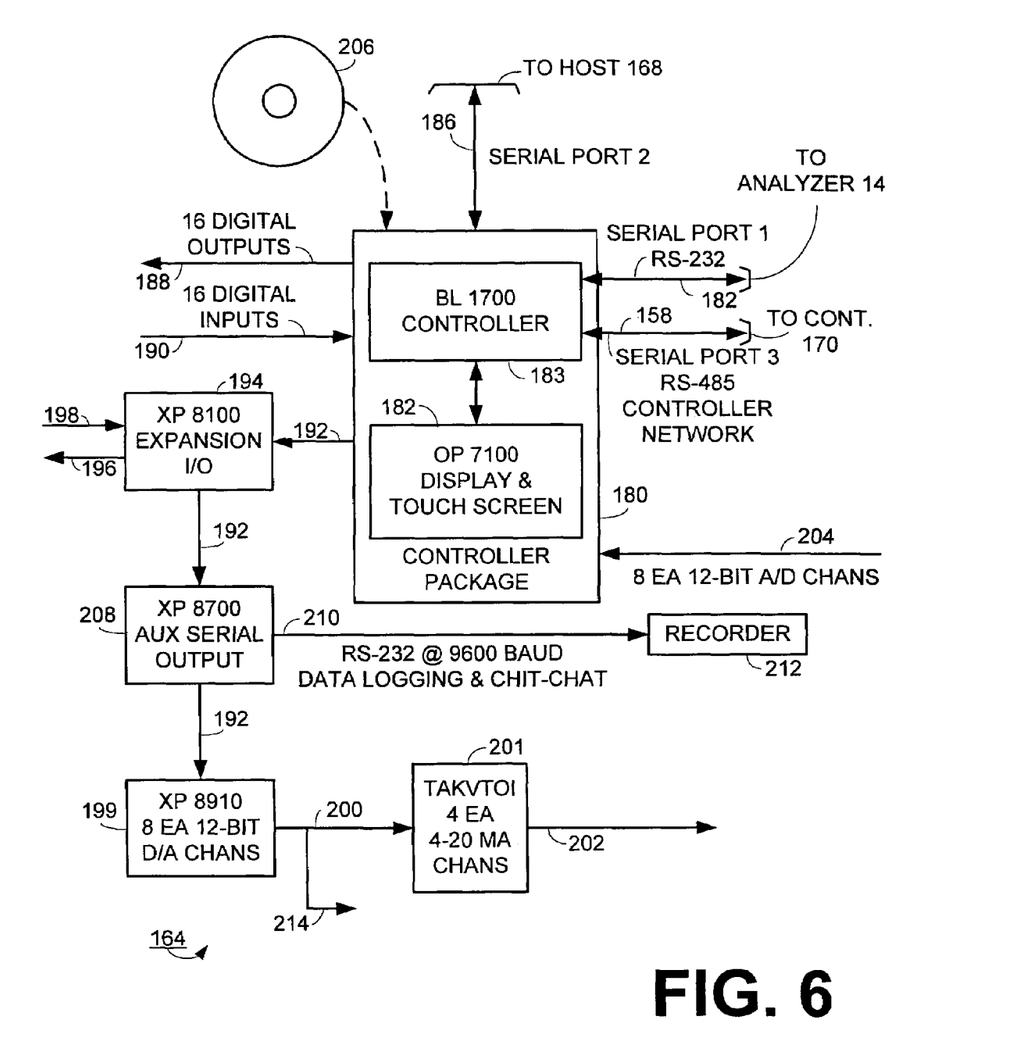
FIG. 6 is a block diagram of a controller, which is employed with the system of FIG. 1.

Considering now the controller 26 in greater detail with reference to FIG. 6, the controller 164 includes a controller package 180, which includes a plurality of digital inputs, digital outputs, serial ports, A/D channels, and a PLC BUS. One example of such a controller is a Z-World controller under the model No. PK 2600. Such a controller from Z-World contains a BL 1700 controller 183 and an OP 7100 display and touch screen 182. Controller package 180 has a first serial port 182, which provides RS 232 communications between the controller 180 and an analytical instrument, such as analytical instrument 14. A second serial port 186 provides communications between the controller 180 and the host computer 168, or to a master controller (not shown). A third serial port 158 is also provided on the controller package 180 and provides RS-485 communications to the bath temperature controller 170 as best shown on FIG. 1. Controller package 180 also includes 16 digital outputs shown generally as the cable 188 that are operatively connected to various pumps and valves of the fractional fill mixing apparatus and system 10, including the ingredient supply control device 16. The controller package 180 also contains 16 digital inputs shown generally as 190 which provide digital input to the controller package 180 for various level sensors, leak detectors and other. Such a level sensor is shown on FIG. 1 as level sensor 154 connected through digital input line 156 to the controller 170.

A PLC bus is also included with the controller package 180 and shown generally as 192. The PLC bus emanates from the controller package 180 as a ribbon cable and is attached to a plurality of extension devices, such as an expansion 10 device 194, auxiliary serial output device 208, a D/A channel device 199. The PLC bus provides digital input and output control of these accessory devices from the controller package 180.

Expansion 10 device 194 provides additional digital outputs which may be used to control additional components in the fractional fill mixing system 10.

The auxiliary serial output accessory 208 is also connected to the PLC bus 192 and provides an additional RS 232 communications port used for data logging and chit-chat used primarily for monitoring and software development. This RS 232 port shown generally at 210 may be also connected to a recorder 212 for recording and monitoring operations on the controller package 180. Software for the controller package 180 may also be loaded, if desired, through this RS 232 communications port 210.

The D/A accessory 199 is additionally connected to the PLC bus 192 and provides analog outputs to control various components on the fractional fill mixing apparatus and system 10 shown generally on FIG. 1. One such component that may be controlled by the D/A accessory 199 may be the ingredient supply control devices 126, 128, or 130 as well as the pumps 88 and 114. Optionally, a TAKVTOI accessory may be operatively coupled to the D/A accessory to convert the analog voltage outputs from the accessory 199 to a plurality of current signals. These current signals created by the TAKVTOI accessory 201 may be used to drive various metering pumps as part of a fractional fill mixing apparatus and system 10.

The controller package 180 also includes eight 12-bit A/D channels to monitor a variety of information from the fractional fill mixing system 10. For example, the thermalcouple such as the thermalcouple 146 (FIG. 1) may be coupled to one of the A/D channels 204 so that the controller package 180 may monitor the temperature of the admixture. In addition, the A/D channels may also monitor various flow controllers or metering pumps which may be part of a typical fractional fill mixing system 10.

A fractional fill algorithm or method may be loaded in the form of software to the controller package 180 through a suitable storage media such as a compact disk 206 which contains the fractional fill algorithm or method thereon, or loaded through the RS 232 communications port 210.

While the present embodiments of the invention as disclosed herein have been particularly shown and described with reference to particular embodiments thereof, it will be understood by those skilled in the art that various changes in form and details may be made therein without department from the true spirit and scope of the present invention.

What is claimed is:

1. An apparatus for formulating a batch, comprising:
   a tank;
   at least two chemical dispensing devices, each chemical dispensing device having an input and an output, each input coupled to a chemical supply;
   a manifold coupled to the output of each of the at least two chemical dispensing devices, the manifold having an outlet that is coupled to the tank such that chemicals dispensed from the chemical dispensing devices are transferred to the manifold and from the manifold into the tank;
   an analytical instrument for measuring the quantities of one or more ingredients in a chemical mixture, the analytical instrument coupled to the tank;
   a conduit configured to transfer fluid from the tank to the manifold, wherein fluid travels from the manifold to the tank and from the tank through the conduit back to the manifold to form a recycle loop;
   a controller coupled to the chemical dispensing devices and the analytical instrument, wherein the controller controls the flow of chemicals from the chemical dispensing devices and the flow of fluid through the recycle loop based on the measurements received from the analytical instrument.

2. The apparatus of claim 1, wherein at least one of the chemical dispensing devices is configured to dispense water.

3. The apparatus of claim 1, wherein at least one of the chemical dispensing devices is configured to dispense hydrogen peroxide.

4. The apparatus of claim 1, wherein at least one of the chemical dispensing devices is configured to dispense ammonium hydroxide.

5. The apparatus of claim 1, further comprising:
   a heater coupled to the mixing tank, wherein the heater heats the mixing tank; and
   a temperature controller coupled to the heater and the controller, wherein the temperature controller controls the output of the heater based on a communication from the controller.

6. The apparatus of claim 1, wherein the analytical instrument comprises a spectral adsorption device.

7. The apparatus of claim 1, wherein the one or more ingredients have a known supply concentration.

8. The apparatus of claim 1, wherein at least on of the measurements received from the analytical instrument comprises a specific gravity of at least one of the ingredients.

9. The apparatus of claim 1, wherein at least one of quantities of the one or more ingredients comprises a volume percentage.

10. The apparatus of claim 1, wherein at least one of quantities of the one or more ingredients comprises a weight percentage.

11. The apparatus of claim 1, further comprising a conduit configured to transfer the chemical solution from the mixing tank to a process chamber.

* * * * *